United States Patent
Sugiyama et al.

(10) Patent No.: US 6,345,245 B1
(45) Date of Patent: *Feb. 5, 2002

(54) METHOD AND SYSTEM FOR MANAGING A COMMON DICTIONARY AND UPDATING DICTIONARY DATA SELECTIVELY ACCORDING TO A TYPE OF LOCAL PROCESSING SYSTEM

(75) Inventors: Hiroshi Sugiyama, Tokyo; Kazuhiro Kimura; Shuichi Tsujimoto, both of Kanagawa-ken, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,269

(22) Filed: Mar. 5, 1998

(30) Foreign Application Priority Data

Mar. 6, 1997 (JP) .............................. 9-051850

(51) Int. Cl.⁷ .............................................. G06F 17/21
(52) U.S. Cl. .......................................... 704/10; 707/532
(58) Field of Search ................................ 704/1, 2, 3, 7, 704/8, 10, 246, 251, 257, 270, 277; 707/530, 531, 532, 535, 536, 10

(56) References Cited

U.S. PATENT DOCUMENTS

| | | | | |
|---|---|---|---|---|
| 5,185,887 A | * | 2/1993 | Takahashi et al. | 707/203 |
| 5,251,316 A | * | 10/1993 | Anick et al. | 707/101 |
| 5,311,429 A | * | 5/1994 | Tominaga | 704/10 |
| 5,359,514 A | * | 10/1994 | Manthuruthil et al. | 704/10 |
| 5,404,299 A | * | 4/1995 | Tsurubayashi et al. | 704/10 |
| 5,535,120 A | * | 7/1996 | Chong et al. | 704/3 |
| 5,594,642 A | * | 1/1997 | Collins et al. | 707/535 |
| 5,761,688 A | * | 6/1998 | Morishita | 707/532 |
| 5,875,443 A | * | 2/1999 | Nielsen | 707/2 |
| 6,088,699 A | * | 7/2000 | Gampper et al. | 707/10 |

FOREIGN PATENT DOCUMENTS

| | | | |
|---|---|---|---|
| JP | 403071076 A | * | 4/1991 |
| JP | 404003244 A | * | 1/1992 |
| JP | 406124301 A | * | 5/1994 |
| JP | 8-212216 | | 8/1996 |
| JP | 408329066 A | * | 12/1996 |

* cited by examiner

Primary Examiner—Joseph Thomas
(74) Attorney, Agent, or Firm—Oblon, Spivak, McClelland, Maier & Neustadt, P.C.

(57) ABSTRACT

A common dictionary management system that can reduce the work of data registration into dictionaries. Exchange data generated in any local dictionary of a natural language processing system is sent to the local dictionaries of other natural language processing systems automatically. A local dictionary management portion and a common dictionary management portion collect updated dictionary data from a plurality of local dictionaries and updating time information. The local dictionary management portion updates the common dictionary and the local dictionaries according to the collected dictionary data and the time information. The local dictionary management portion compares the information with the latest time on which dictionary data was distributed to the local user dictionaries with the updating time information of the dictionary data in the common dictionary to distribute the dictionary data of the common dictionary selected according to the result of the comparison, to the local dictionaries.

13 Claims, 9 Drawing Sheets

*FIG. 2*

| COMMON DICTIONARY LATEST CHANGE TIME $T_L$ | | | | | | |
|---|---|---|---|---|---|---|
| EXCHANGE DATA SOURCE LOCAL DICTIONARY TAG | EDIT TYPE | $T_i$ | $T_{ti}$ | DESCRIPTION | PART OF SPEECH | ... |
|  |  |  |  |  |  |  |
|  |  |  |  |  |  |  |
|  |  |  |  |  |  |  |
| ⋮ | ⋮ | ⋮ | ⋮ | ⋮ | ⋮ | ⋮ |

*FIG. 3*

| MATCHING CHECK TIME $t_c$ | | | | | | |
|---|---|---|---|---|---|---|
| FLAG FOR DIRECTION | EXCHANGE DATA SOURCE LOCAL DICTIONARY TAG | EDIT TYPE | $t_i$ | DESCRIPTION | ... |
|  |  |  |  |  |  |
|  |  |  |  |  |  |
|  |  |  |  |  |  |
| ⋮ | ⋮ | ⋮ | ⋮ | ⋮ | ⋮ |

FIG. 5

| REGISTRATION IN JAPANESE-ENGLISH TRANSLATION DICTIONARY |
|---|
| ENTER THE JAPANESE WORD CORRESPONDING TO THE FOLLOWING WORD "INTERNET" <br> TRANSLATED WORD: ☐ |

FIG. 6

| EXCHANGE DATA SOURCE LOCAL DICTIONARY TAG | GROUP | LOCAL → COMMON TRANSMISSION | LOCAL → COMMON TRANSMISSION |
|---|---|---|---|
| WORD PROCESSOR A | GROUP A | ENABLED | DISABLED |
| TRANSLATION A | GROUP A | DISABLED | ENABLED |
| WORD PROCESSOR B | GROUP A | DISABLED | ENABLED |
| WORD PROCESSOR C | GROUP B | ENABLED | ENABLED |
| ABSTRACT A | GROUP B | ENABLED | ENABLED |
| TRANSLATION B | GROUP B | ENABLED | ENABLED |
| WORD PROCESSOR D | GROUP B | ENABLED | DISABLED |

*FIG. 9*

| COMMON DICTIONARY LATEST CHANGE TIME $T_L$ | | | | | | | |
|---|---|---|---|---|---|---|---|
| ID | EXCHANGE DATA SOURCE LOCAL DICTIONARY TAG | EDIT TYPE | $T i$ | $T t i$ | DESCRIPTION | PART OF SPEECH | ... |
| 0 1 | WORD PROCESSOR A | REGISTER | $T_1$ | $T t 1$ | INTERNET | NOUN | |
| 0 2 | WORD PROCESSOR B | DELETE | $T_2$ | $T t 2$ | PROVIDER | NOUN | |
|  |  |  |  |  |  |  | |
| . . . | . . . | . . . | . . . | . . . | . . . | . . . | . . . |

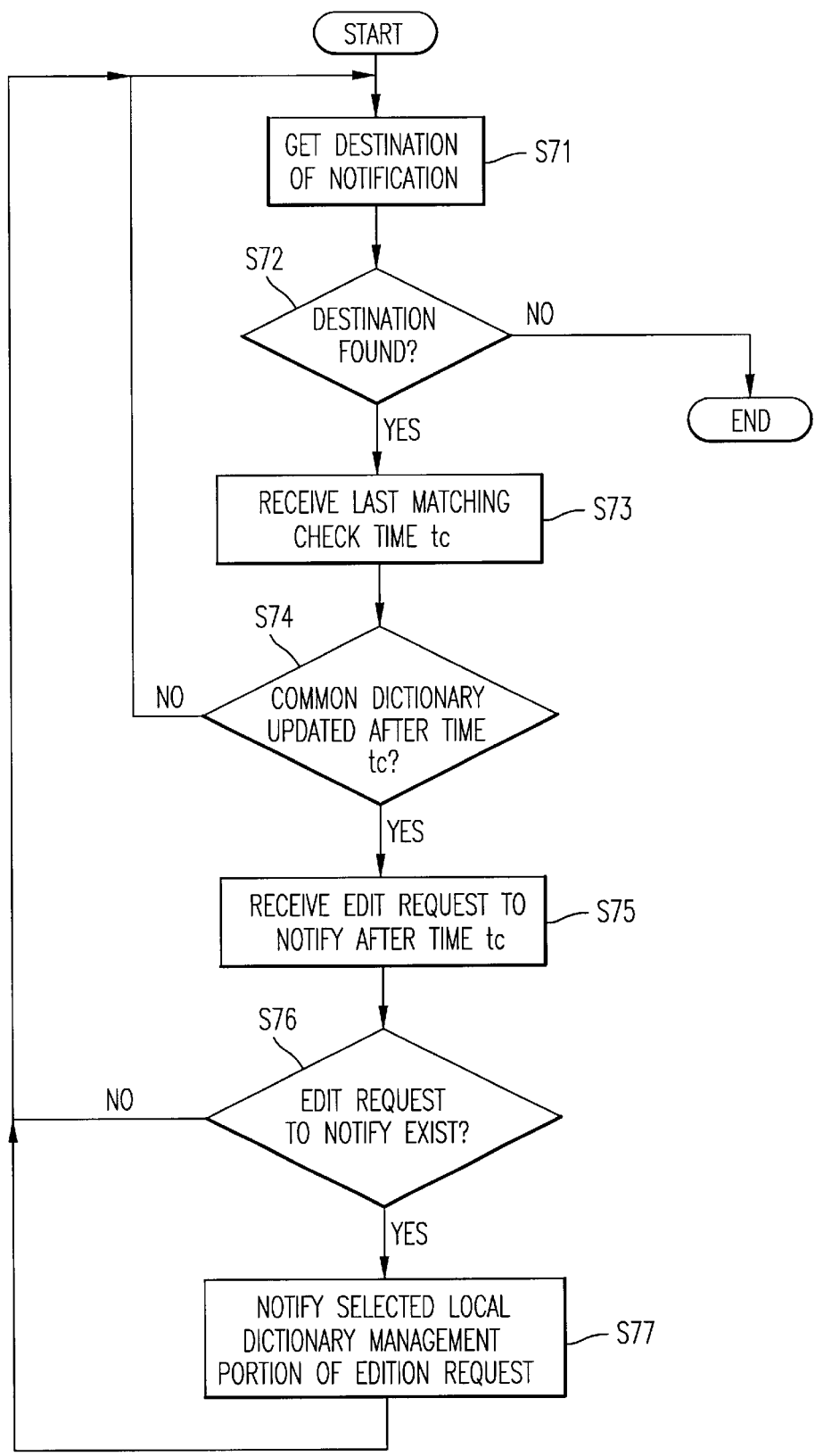

FIG. 11

| EXCHANGE DATA SOURCE LOCAL DICTIONARY TAG | GROUP | LOCAL → COMMON TRANSMISSION | COMMON → LOCAL TRANSMISSION |
|---|---|---|---|
| WORD PROCESSOR A | GROUP A | ENABLED | DISABLED |
| TRANSLATION A | GROUP A | DISABLED | ENABLED |
| WORD PROCESSOR B | GROUP A | DISABLED | ENABLED |
| WORD PROCESSOR C | GROUP B | ENABLED | ENABLED |
| ABSTRACT A | GROUP B | ENABLED | ENABLED |
| TRANSLATION B | GROUP B | ENABLED | ENABLED |
| WORD PROCESSOR D | GROUP B | ENABLED | DISABLED |
| WORD PROCESSOR F | GROUP A | ENABLED | ENABLED |

METHOD AND SYSTEM FOR MANAGING A COMMON DICTIONARY AND UPDATING DICTIONARY DATA SELECTIVELY ACCORDING TO A TYPE OF LOCAL PROCESSING SYSTEM

BACKGROUND OF THE INVENTION

1. Field of the Invention

The present invention relates to a natural language processing system having such functions as word processing, machine translation, character recognition, abstract creation, voice recognition, voice synthesizing, etc., and more particularly, to a natural language processing system comprising a plurality of connected natural language processing systems.

Furthermore, the present invention relates to a common dictionary management system for use with a natural language processing system comprising a plurality of connected natural language processing systems.

2. Description of the Related Art

Current technology allows information to be transmitted in a variety of media including facsimile images, voice, and international electronic mail. Further, various forms of language information are used for those media. Under such circumstances, it is expected that the environment that enables information to be processed using technologies that convert information transmitted over such media to information understandable by unspecified computers, as well as the use of language processing technologies that converts and abstracts languages freely, will become increasingly important and required.

Conventionally, such technologies have been realized as specific systems for translating electronic mail transmitted from overseas from English into Japanese and as text and text converted to voice. In other words, such electronic mail is first translated using an English-Japanese translation system provided by an English-Japanese dictionary. Then, the resulting Japanese text is converted into speech using a voice synthesizing system provided by a Japanese voice synthesizing dictionary in a series of processings. In such a system, however, both the translation and voice synthesizing systems have dedicated dictionaries, and no dictionary is shared by either system, although a system that can execute the above series of processings automatically is already materialized for them. Thus, data must be registered/deleted into/from those translation and voice synthesizing dictionaries individually. Even when a Japanese word corresponding to a new English word is registered in the translation dictionary, the "pronunciation" and "accent" of the Japanese word must separately be registered in the voice synthesizing dictionary. And, as often seen in recent years, when one person uses a plurality of computers, for example, when that person uses a portable terminal in addition to an office desktop type computer in an office, the same registration operation must separately be performed for the dictionaries of both the translation systems provided in the desktop computer and in the portable terminal.

To facilitate such operations, one may copy the dictionaries, store functions in a server for use, and/or do other necessary operations. In the former example, in some natural language processings, the environment for using natural language processings can be shared among computers by copying user dictionaries. In the latter example, natural language processing functions can be stored in a server so that the same natural language processing can be used from any terminal. However, both methods can execute those natural language processings only in a closed system (e.g., either translation or voice synthesizing only), but no dictionary registration is possible over different types of systems. For example, when translation and voice synthesizing systems are used as explained above, a Japanese word corresponding to a new English word may be registered in the translation dictionary. In this case, however, a text including the new word cannot be voice-synthesized. To voice-synthesize the new word, the word must also be registered in the voice synthesizing dictionary separately.

Even when a natural language processing system includes a plurality of natural language processing systems connected to each other, such as word processing, machine translation, abstract creation, voice recognition, voice synthesizing, etc., new data must be registered in each dictionary separately. So far it has been impossible to reduce the work of such registration.

SUMMARY OF THE INVENTION

Under such circumstances, it is an object of the present invention to provide a common dictionary management system that can automatically register information changed in a specific dictionary of a natural language processing system in the dictionaries of other natural language processing systems.

It is another object of the present invention to provide a common dictionary management system that can specify the range of dictionaries in which changed information will be registered when the changed information in a specific dictionary of a natural language processing system is automatically registered in the dictionaries of other natural language processing systems.

In other words, the common dictionary management method of the present invention is a method for managing a common dictionary by collecting dictionary data of the local user dictionary belonging to each of a plurality of language processing systems and distributing dictionary data to those local user dictionaries, wherein dictionary data updated in any local user dictionary belonging to one of a plurality of the language processing systems is collected and the common dictionary is updated according to this collected dictionary data. Furthermore, the dictionary data of this updated common dictionary is distributed to the local user dictionaries of the language processing systems that satisfy preset conditions. Thus, a change generated in the dictionary information of a natural language processing system is automatically extended to the dictionaries of other natural language processing systems, and furthermore, the work of data registration into the dictionaries made for each natural language processing function conventionally can be reduced significantly by controlling the dictionary range to which the change is extended.

Furthermore, the common dictionary management method of the present invention is a method for managing a common dictionary by collecting dictionary data from local user dictionaries belonging to each of a plurality of natural language processing systems and distributing dictionary data to those local user dictionaries, wherein dictionary data updated in any local user dictionary belonging to one of a plurality of the language processing systems and the updating time information in the dictionary containing the updated dictionary data are collected, and the common dictionary storing dictionary data of the local user dictionaries of each of the language processing systems is updated according to this collected dictionary data and the updating time information of the collected dictionary data. Then the dictionary data information most recently distributed to the dictionaries of the language processing systems is compared with the most recent dictionary data information of the common dictionary. After this, the dictionary data of the common dictionary, selected according to the result of the comparison, is distributed to the dictionaries of the language processing systems that satisfy preset conditions, so that a change generated in dictionary information of a natural language processing system is automatically extended to the dictionaries of other natural language processing systems. Moreover, the work of conventionally registering data into dictionaries for each natural language processing function is reduced significantly by controlling the range of dictionaries to which the change is extended.

Furthermore, the common dictionary management system of the present invention is a system for managing a common dictionary by collecting dictionary data of the local user dictionaries belonging to each of a plurality of language processing systems and distributing dictionary data to those local user dictionaries, wherein the common dictionary management system comprises a common dictionary storing dictionary data of the dictionaries of a plurality of the language processing systems; a means of collecting dictionary data updated in any of the dictionaries of a plurality of the language processing systems; a means of updating the common dictionary according to the dictionary data collected by the collecting means; and means of distributing the dictionary data of the common dictionary, updated by the updating means, to the dictionaries of the language processing systems that satisfy preset conditions. Consequently, a change generated in the dictionary information of a natural language processing system can be extended to the dictionaries of other natural language processing systems, and furthermore, the work of conventionally registering data into dictionaries for each natural language processing function conventionally can be reduced significantly by controlling the range of dictionaries to which the change is extended.

Furthermore, the recording medium of the present invention is a system for storing a common dictionary readable by a computer connected to a plurality of language processing software, each of which has a local dictionary, via a communication line, and the software used for managing the common dictionary. The recording medium comprises a function of collecting dictionary data updated in any of the local dictionaries of a plurality of the language processing systems via the communication line; a function of updating the common dictionary according to the collected dictionary data; and a function of distributing the dictionary data of the updated common dictionary to the local dictionaries of the language processing systems that satisfy preset conditions. Thus, a change generated in the dictionary information of a natural language processing system can be extended to the dictionaries of other natural language processing systems, and furthermore, the work of conventionally registering data into dictionaries for each natural language processing function is reduced significantly by controlling the range of dictionaries to which the change is extended.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings:

FIG. 2 illustrates how dictionary data is stored in the common dictionary;

FIG. 3 illustrates how data is stored in the exchange data storage portion provided in a natural language processing system;

FIG. 5 is an example of a screen display asking a user who is registering a retrieval dictionary description of the term "INTERNET" into a translation dictionary to provide additional information;

FIG. 6 is an example of a table defining the relationship among a plurality of local user dictionaries stored in the management portion for controlling plurality of local user dictionaries;

FIG. 9 illustrates how dictionary data is stored in the common dictionary;

FIG. 10 is a flow chart explaining the operation of the common dictionary management portion when a dictionary edition request is sent to the local user dictionary management portion of a natural language processing system from the common dictionary management portion; and FIG. 11 is an example of a table defining the relationship among local user dictionaries stored in the management portion for controlling a plurality of local user dictionaries; a natural language processing system is newly added to the management portion for controlling a plurality of local dictionaries.

DESCRIPTION OF THE PREFERRED EMBODIMENT

An embodiment of the present invention will now be explained with reference to the attached drawings.

The "natural language processing system" to be described below is a generic term for systems for converting and recognizing information on the basis of natural language processings such as machine translation, character recognition, abstract creation, voice recognition, voice synthesizing, etc. "Natural language" refers generally to human recognizable information, such as text and speech. "Processing system" may include both stand-alone or networked systems, and "processing system" also includes devices generically referred to as computers and microprocessors as well as their associated devices such as data storage devices. Networked systems may communicate through dedicated communication links, such as cable, or may communicate through the public telephone network.

Figure 1:
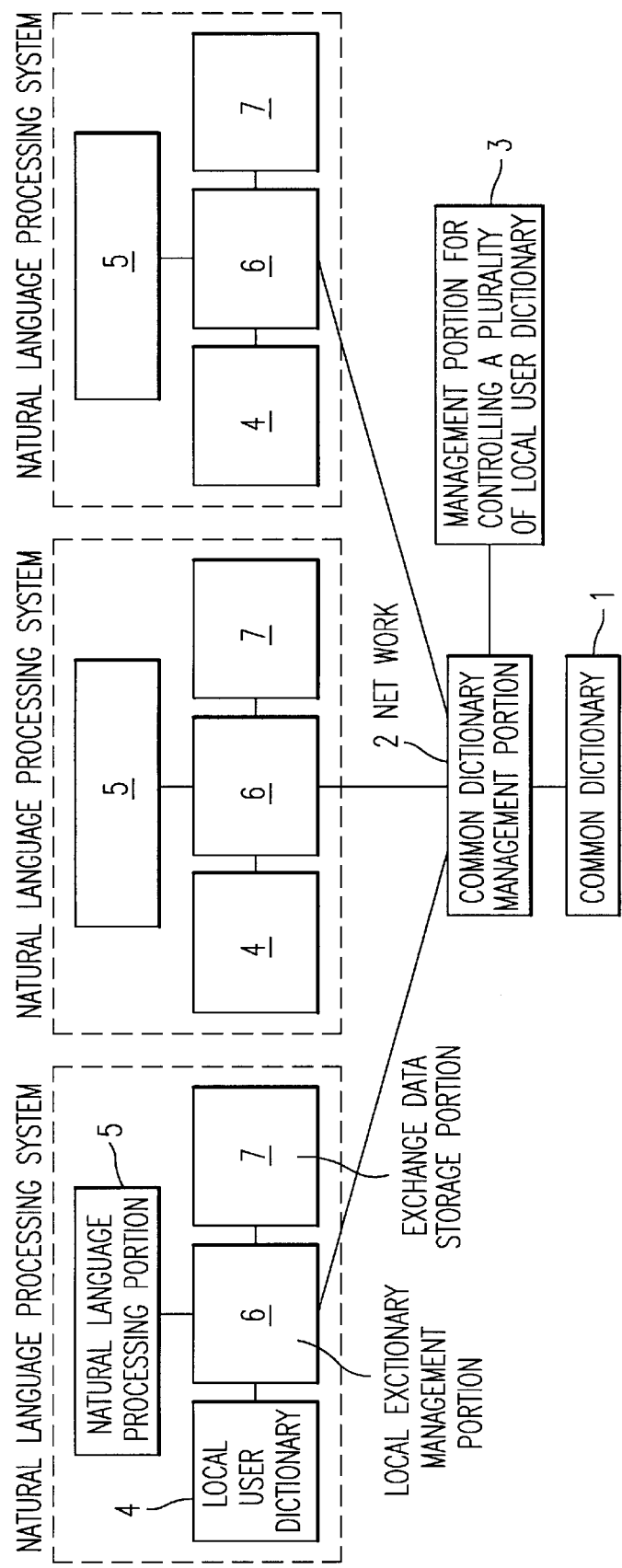
FIG. 1 is a configuration of the common dictionary management system according to an embodiment of the present invention.

FIG. 1 is a configuration of a common dictionary management system in this embodiment.

In FIG. 1, the common dictionary management system comprises a plurality of natural language processing systems that are connected communicably to each other, a common dictionary management portion 2, a common dictionary 1, and a management portion 3 for controlling a plurality of local user dictionaries.

Each natural language processing system is a processing system such as a translation or pattern recognition processing system. The system comprises a natural language processing portion 5 used to execute language and recognition processing, a local user dictionary 4 used to store language and pattern information, a local user dictionary management portion 6 used to manage data accesses to the local dictionary 4, and an exchange data storage portion 7 used to temporarily store data exchanges performed between the common dictionary management portion 2 and the local user dictionary management portion 6.

This embodiment includes a case in which the natural language processing system is distributed and each natural language processing system is separated temporarily from the common dictionary management portion 2. In other words, one natural language processing system may be provided to a portable terminal and another natural processing system and the common dictionary management portion 2 may be provided in a network. Furthermore, a plurality of natural language processing systems, the common dictionary management portion 2, the common dictionary 1, and the management portion 3 for controlling a plurality of local user dictionaries may be all provided in a computer.

When the natural language processing portion of a natural language processing system generates a request for registration/deletion into/from a dictionary (hereafter, to be referred to as a dictionary edit), the local user dictionary management portion 6 executes ordinary dictionary editing for the local user dictionary 4 and stores its contents in the exchange data storage portion 7. After this, the local user dictionary management portion 6 transmits the dictionary edit to the common dictionary 1. If the communication with the common dictionary management portion 2 is disabled at this time, such as when the common dictionary management portion 2 is disconnected from the network, the contents of the dictionary edit stored in the exchange data storage portion 7 are kept stored until communication with the common dictionary 1 is enabled.

The common dictionary management portion 2 manages data access to the it common dictionary I and transmits the dictionary edition by communicating with the local user dictionary management portion 6 of each natural language processing system.

The common dictionary 1 has data items, including those of all the local user dictionaries 4, and holds the contents of the dictionary edit executed in each natural language processing system.

When a dictionary edit request is issued from the local user dictionary management portion 6, the common dictionary management portion 2 edits the common dictionary I on the basis of the relationship among the natural language processing systems defined in the management portion 3 for controlling a plurality of local dictionaries. Furthermore, the common dictionary management portion 2 selects a natural language processing system to which the dictionary edit is transmitted according to the information defined in the management portion 3 for controlling a plurality of local dictionaries and notifies the local user dictionary management portion 6 of the selected natural language processing system for the dictionary. If the communication with the selected natural language processing system is disabled at this time, the dictionary edit is transmitted when the communication is enabled.

Thus, in the common dictionary management system of the present invention, the data of the dictionary edit executed by a natural language processing system can be shared among specific natural language processing systems under predetermined conditions.

FIG. 2 shows an example of the structure of dictionary data stored in the common dictionary 1. The common dictionary 1 holds data items (description, parts of speech, pronunciation, translated words, meanings, morphology, sentence patterns, tenses, voices, aspects, moods, etc.) and comprises a single file or a plurality of files classified by usage field, etc. In addition to those data items, the common dictionary 1 also has the following additional data items necessary for transmitting dictionary edits:

an "exchange data source local dictionary tag" used to indicate the local dictionary 4 in which the subject dictionary edit is executed;

an "editing time in the common dictionary" Ti used to indicate the time on which the subject dictionary edit was executed in the common dictionary 1;

an "change type" used to indicate the type (registration/deletion) of dictionary edit; and "local dictionary change time" Tti used to indicate the time on which the subject dictionary edit (updating of dictionary contents) was executed in the exchange data source local dictionary 4.

In addition, the common dictionary 1 holds the "common dictionary latest change time" TL, which is the latest time on which the data in the common dictionary 1 was updated.

FIG. 3 is an example of the structure of data stored in the exchange data storage portion 7 provided in each natural language processing system.

The exchange data storage portion 7 stores information exchanges concerning dictionary edition between the local user dictionary management portion 6 and the common dictionary management portion 2 temporarily. Due to the function of this exchange data storage portion 7, it becomes possible to transmit a dictionary edit executed during a temporary disconnection between a natural language processing system and the common dictionary 1. In addition to those data items including the contents of each local user dictionary 4, the exchange data storage portion 7 also holds the following additional data items necessary for transmitting dictionary edits:

an "exchange data source local user dictionary tag";

a "change type";

a ti indicating the time when the subject dictionary edit was executed in a local user dictionary 4;

a "matching check time" tc indicating the time on which a dictionary edit request was transmitted from the common dictionary management portion 2 to the local user dictionary management portion 6;

a directional flag indicating a local user dictionary 4 or the common dictionary 1 to which the subject dictionary edit is transmitted.

The directional flag is used to determine the direction in which the subject dictionary request is transmitted when the request is taken out from the exchange data storage portion 7.

Next, the operation of the local user dictionary management portion 6 will be explained with reference to the flow chart shown in FIG. 4, which is executed until dictionary edit is transmitted from a natural language processing system to the common dictionary management portion 2.

At first, the local user dictionary management portion 6 starts the dictionary edit for a local user dictionary 4 in any of the following cases:

when a dictionary edit request is received from the natural language processing portion 5;

when a dictionary edit request is received from the common dictionary management portion 2; and when an unprocessed dictionary edit request is left in the exchange data storage portion 7.

Receiving such a dictionary edit request from the common dictionary management portion 2, the local user dictionary management portion 6 updates the matching check time tc of the exchange data storage portion 7 to the current time. The tc will be explained later in detail.

Step 0:

The local user dictionary management portion 6 determines the timing of the dictionary edit. When the dictionary edit is started with a request from the natural language processing portion 5, the local dictionary management portion 6 goes to step 1 as it stands. When the dictionary edit is started with a request from the common dictionary management portion 2 or the exchange data storage portion 7, the dictionary edit is generated at a time not intended by the user. Thus, the local user dictionary management portion 6 decides whether to start the dictionary edit right away. If the decision is made to start the dictionary edit right away, the local dictionary management portion 6 goes to step 1. This decision may be made on the basis of a user specification, the priority of the dictionary request, etc. The execution timing may be decided based on the following:

when the request is received;

when the natural language processing system is started; or when another dictionary edit request is received from the natural language processing portion 5.

When not starting the dictionary edit right away, the dictionary edit is postponed until the next time, and the dictionary edit request is stored in the exchange data storage portion 7. Then, the processing ends.

Step 1:

The local user dictionary management portion 6 receives the dictionary edit requests of local dictionaries 4 one by one and goes to step 2. Depending on the source of the request with which the dictionary is started, the local user dictionary management portion 6 receives dictionary edit requests in the following order.

When a dictionary edit is started with a request from the natural language processing portion 5, it:

(1) receives the contents of the dictionary edit request from the natural language processing portion 5;

(2) receives a dictionary edit request for which the directional flag transmitted from the exchange data storage portion 7 is set to "common→local transmission".

When a dictionary edit is started with a request from the common dictionary management portion 2, it:

(1) receives the contents of the dictionary edit request from the common dictionary management portion 2; and (2) receives a dictionary edit request for which the directional flag transmitted from the exchange data storage portion 7 is set to "common→local transmission".

When any unprocessed dictionary edit is left in the exchange data storage portion 7, it:

(1) receives a dictionary edit request for which the directional flag transmitted from the exchange data storage portion 7 is set to "common→local transmission".

When receiving such a dictionary edit request, the local user dictionary management portion 6 also changes the data format. Because the request from the common dictionary management portion 2 is stored with the data format of the common dictionary 1 as shown in FIG. 3, the data format must be changed to that of the local user dictionary 4 of the natural language processing system. If at that time, the parts of speech system in use differs between "natural language processing A" and "natural language processing B", for example, the local user dictionary management portion 6 changes the parts of the speech automatically using a parts-of-speech correspondence table, etc. Step 2:

If the local user dictionary management portion 6 receives a dictionary edit request in step 1, the management portion 6 goes to step 3 and edits the local user dictionary 4. When no dictionary edit request is left, the management portion 6 goes to step 5 to notify the common dictionary management portion 2 of dictionary.

Step 3:

When the local user dictionary management portion 6 receives an edit request, the management portion 6 edits the dictionary in each natural language processing system according to the type of change (registration/deletion). If at this time the edit request lacks any mandatory information of the local user dictionary 4 the management portion 6 will give the default value or ask the user about it. For example, when a description "INTERNET" registered in a natural language processing system is to be registered in on (English-Japanese) translation dictionary, the corresponding Japanese data items such as "(INTAHNETTO)," etc. must be added to the translation dictionary. In this case, the local user dictionary management portion 6 displays a screen as shown in FIG. 5 and asks the user about the Japanese word corresponding to "INTERNET" and receives "(INTAHNETTO)". Otherwise, the translated Japanese word may be registered as an undefined value at that time and the user may be asked to provide the information again the next time the text including "INTERNET" is translated in another natural language processing system used for machine translation. In any case, the information added here is transmitted to the common dictionary management portion 2, so that the information addition time can be significantly reduced when the word is registered in another translation dictionary.

Of course, the machine translation accuracy can be improved more, even when only the description of the word registered in a dictionary of the natural language processing system is transmitted to a translation dictionary.

Furthermore, a batch entry of dictionary data may be enabled by displaying a screen for registration into a dictionary so that data items of a translation dictionary, etc. can also be entered during registration into a dictionary in a specific natural language processing.

Step 4:

If a local user dictionary 4 generated in a natural language processing system is edited or if information is added to a local user dictionary 4 according to a dictionary edit request from the common dictionary management portion 2, this updated edit or the added information must be transmitted to the common dictionary management portion 2. After this, the format of the edited data in the local user dictionary 4 is converted to that of the common dictionary 1. Then, the natural language processing system issues a dictionary edit request (signal) to the common dictionary management portion 2, sets the directional flag for "local→common", and temporarily stores the request in the exchange data storage portion 7. After the processing is completed, the local user dictionary management portion 6 returns to step 1 to process the next dictionary edit request.

Step 5:

After it is confirmed in step 2 that all the dictionary edit requests are processed, the local user dictionary management portion 6 notifies the common dictionary management portion 2 of the dictionary edit information. After receiving a dictionary edit request for which the directional flag is set to "local→common" from the exchange data storage portion 7, the local user dictionary management portion 6 notifies the common dictionary management portion 2 of the request. If unable to communicate with the common dictionary management portion 2 at this time, the processing is ended leaving the request in the exchange data storage portion 7. The transmission is put off to the next time.

The dictionary edit for a local user dictionary 4 is executed in the natural language processing system as follows: Newly added dictionary information is sent to the common dictionary management portion 2. When a local user dictionary 4 is updated with the dictionary edit requested from the common dictionary management portion 2 in the above processing, the dictionary edit data is notified to the user during or at the end of the processing.

Subsequently, the operation of the common dictionary management portion 2 will be explained with reference to the procedure for updating the common dictionary 1 with a dictionary edit request from a natural language processing system and transmitting the request to other natural language processing systems.

The common dictionary management portion 2 is characterized by the control of the transmission of the contents of a dictionary edit executed in a natural language processing system to other natural language processing systems. The common dictionary management portion 2 controls transmission of a dictionary edit according to the definition stored in advance in the management portion 3 for controlling a plurality of local dictionaries.

There may be some methods considered to define the relationship among local user dictionaries in the management portion 3 for controlling a plurality of local dictionaries according to the type of natural language processing system and the words to be shared. For example, when it is desired to share words used only in a specific group, a natural language processing system may be classified in that group, and dictionary edits are then transmitted only among the local user dictionaries 4 of the natural language processing systems belonging to the same group.

Furthermore, although words registered in all other natural language processing systems are transmitted to a retrieval system, they may be controlled according to the type of the natural language processing system, which only requires transmission of "accent" information registered in a voice synthesizing system between voice synthesizing systems.

In addition to the transmission range, the method may be expanded, for example, by defining the timing for transmitting a dictionary edit generated in a local user dictionary 4 of a natural language processing system to other natural language processing systems.

In this embodiment, how a natural language processing system is distributed in some groups and managed will be explained.

Each group to which a natural language processing system belongs is defined as shown in FIG. 6, and it is assumed that one natural language processing system does not belong to a plurality of groups. To enable one natural language processing system to belong to a plurality of groups, when any dictionary data transmitted to local user dictionaries 4 is edited again, the group from which the dictionary data has been transmitted must be known. Thus, a "group tag" used to determine a group that shares dictionary data of the description is added to and stored in the local user dictionary 4 in each natural language processing system as a data item.

In the table shown in FIG. 6, for example, a natural language processing system whose local dictionary tag is "word processor A" belongs to "group A" as shown. The table indicates that the dictionary edit executed in the word processor A can be transmitted to another natural language processing system belonging to the group A ("ENABLED"), and the dictionary edit executed in another natural language processing system belonging to the group A cannot be transmitted to a natural language processing system whose local dictionary tag is "word processor A"("DISABLED"). In this embodiment, a table defining the relationship among local user dictionaries as shown in FIG. 6 is stored in the management portion 3 for controlling a plurality of local dictionaries.

Next, the operation of the common dictionary management portion 2 using the management portion 3 for controlling a plurality of local dictionaries provided with a table as shown in FIG. 6 will be explained with reference to the flow chart shown in FIG. 7. In this case, the common dictionary management portion 2 is notified of a dictionary edit request from the local user dictionary management portion 6.

Figure 4:
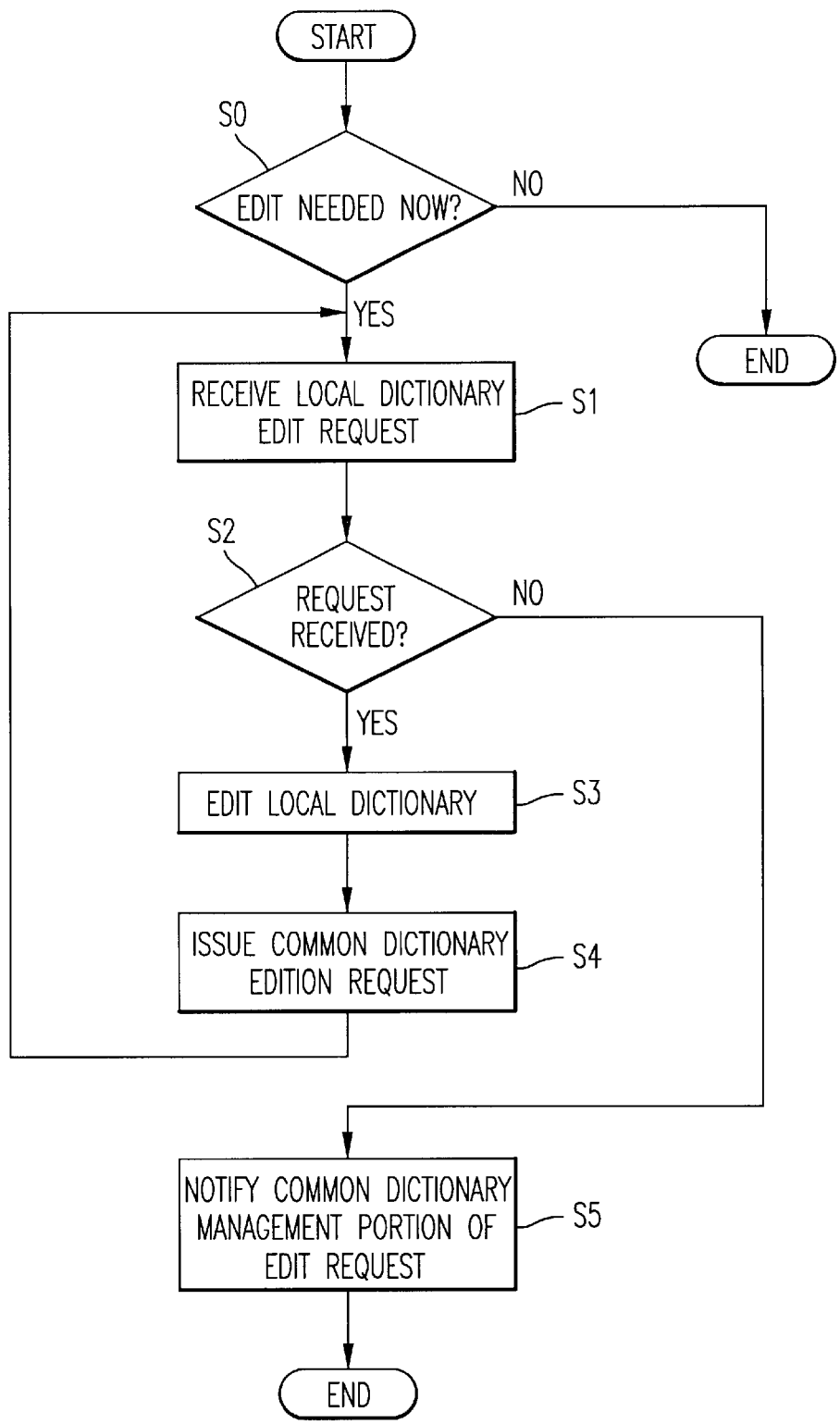
FIG. 4 is a flow chart explaining the operation of the local user dictionary management portion up to when the dictionary edition is transmitted from a natural language processing system to the common dictionary management portion.

The common dictionary management portion 2 starts editing of the common dictionary 1 according to a common dictionary edit request from the local user dictionary management portion 6, which is issued in step 5 shown in FIG. 4.

Step 61:

The common dictionary management portion 2 receives a common dictionary edit request from the local user dictionary management portion 6.

Step 62:

After receiving the request, the common dictionary management portion 2 goes to step 63 to edit the common dictionary 1. When all the common dictionary edit requests are processed, the common dictionary management portion 2 goes to step 66 to transmit the edited data to other natural language processing systems.

Step 63:

The common dictionary management portion 2 asks the management portion 3 for controlling a plurality of local dictionaries about whether or not the edit request from the local user dictionary management portion 6 can be registered in the common dictionary 1. The management portion 3 for controlling a plurality of local dictionaries determines the answer to the inquiry from the common dictionary management portion 2 according to YES or NO set in the data item "transmission from local to common" from the request source natural language processing system according to the definition in the table defining the relationship among local user dictionaries shown in FIG. 6, which is held in itself.

Step 64:

If a dictionary edit for the common dictionary 1 is enabled, the common dictionary management portion 2 goes to step 65. If the edition is disabled, the common dictionary management portion 2 returns to step 61 to receive the next dictionary edit request.

Step 65:

The common dictionary management portion 2 edits the common dictionary 1 according to the common dictionary edit request, then returns to step 61 to process the next dictionary edit request. The method for editing the common dictionary 1 will be explained later in detail.

Step 66:

After ending processing of all the common dictionary edit requests, the common dictionary management portion 2 updates the common dictionary latest change time TL.

Step 67:

Finally, the common dictionary management portion 2 transmits the dictionary edit to other natural language processing systems. Before this transmission, the common dictionary management portion 2 asks the management portion 3 for controlling a plurality of local dictionaries about the natural language processing systems to which the dictionary edit should be transmitted. The management portion 3 for controlling a plurality of local dictionaries selects the natural language processing systems in which the "common→local transmission" is enabled from the natural language processing systems belonging to the same group as that of the natural language processing system in which the dictionary has been edited. The common dictionary management portion 2 then sends the dictionary edit to the local user dictionary management portion 6 of the natural language processing systems selected by the management portion 3 for controlling a plurality of local dictionaries. If the communication with the target natural language processing systems is disabled at this time, the transmission of the dictionary edit is put off to the next time.

The dictionary edit is transmitted from the common dictionary 1 to local user dictionaries 4 not only when the dictionary edit is executed for the common dictionary 1 as described above, but also when a request is issued from the local user dictionary management portion 6. This is because the natural language processing system is not always enabled for communications with the common dictionary management portion 2. So, the local user dictionary management portion 6 must ask the common dictionary management portion 2 about the transmission on its own initiative. The detailed operation of the common dictionary management portion 2 for notifying the local user dictionary management portion 6 of such a dictionary edit request will be explained later.

Next, the editing of the common dictionary 1 in step 65 shown in FIG. 7 will be explained with reference to the flow chart shown in FIG. 8.

In this case, it is assumed that the contents stored in the common dictionary 1 are, for example, the same as those shown in FIG. 9. The data structure shown in FIG. 9 is also provided with the "ID" to be added to each unit dictionary data, in addition to the data items shown in FIG. 2.

Step 81:

When data is registered in the common dictionary 1, the common dictionary management portion 2 goes to step 82. When data is deleted from the dictionary 1, the common dictionary management portion 2 goes to step 88.

Step 82:

When registering data in the common dictionary 1, the common dictionary management portion 2 searches the common dictionary 1 for any data having the same description and belonging to the same group as that of the exchange data source natural language processing system. If such data is found, the common dictionary management portion 2 goes to step 84. If not, the management portion 2 goes to step 83.

Step 83:

Because the same dictionary data is not found in the common dictionary 1, the common dictionary management portion 2 changes the "edit type" to "register" and updates Ti to the current time, and then adds the updated time in the common dictionary 1. For example, if in case of the common dictionary as shown in FIG. 9, a registration request of a particular description is received from a natural language processing system whose local dictionary tag is "word processor A", then the common dictionary management portion 2 changes "ID" to "D3", "exchange data source local dictionary tag" to "word processor A", "change type" to "register", and "Ti" to the editing time in the common dictionary, that is, "the current time T3", and "Tti" to the editing time in the exchange data source local dictionary, that is, "Tt3", respectively, and then registers the unit dictionary data in the common dictionary 1. This is because the unit dictionary data concerning the description is not found in the common dictionary 1.

Step 84:

If the data concerning the same description is found in the common dictionary 1 and the "change type" of the described data is "register"$_1$ the common dictionary management portion 2 goes to step 85. If "change type" is "delete", the management portion 2 goes to step 86.

Step 85:

Since the description is already registered, both contents are compared. If any difference is found between them, the existing one is updated. Then, both the "exchange data source local dictionary tag" and "Tti" are corrected and "Ti" is updated to the current time, ending the processing. For example, if in case of the common dictionary as shown in FIG. 9, a registration request of a description "INTERNET" is received from a natural language processing system having a local dictionary tag of "translation A" and belonging to the same group as that of the natural language processing system whose local dictionary tag is "word processor A", the contents of both descriptions are compared and the existing one is corrected. Then, the processing ends. This is because the description of "INTERNET" is already registered as dictionary data whose "ID" is "D1".

Step 86:

When the "change type" is "delete", the corrections are compared to identify the latest one. Concretely, the "Tti" indicating the time when the data in the common dictionary 1 was deleted from the exchange data source local dictionary is compared with the "ti" indicating the time when the processing request as currently processed was registered in the local dictionary. If the time "ti" is later, the common dictionary management portion 2 goes to step 87. Otherwise, since the dictionary data is registered before the existing one is deleted, the common dictionary management portion 2 ends the processing with no operation.

Step 87:

The common dictionary management portion 2 updates the data including the changes of "exchange data source local dictionary tag" to the current request source, the "change type" to "delete", and the "Ti" to the current time, then ends the processing. For example, if in case of the common dictionary as shown in FIG. 9, a registration request of a description "PROVIDER" is received from a natural language processing system whose local dictionary tag is "word processor A" and which belongs to the same group. Then, the common dictionary management portion 2 compares "t3" indicating the time when "PROVIDER" was registered in the local dictionary whose local dictionary tag is "word processor A" with the time "Tti". If the time "t3" is later, the common dictionary management portion 2 updates the data by changing the "D2" change type to "register", then changes "Tt2" to "t3" and "T2"to the current time, respectively. This is because the dictionary data whose "ID" is "D2" exists in the common dictionary 1 as the description of "PROVIDER" with the change type of "delete".

Step 88:

When deleting any data from the common dictionary 1, the common dictionary management portion 2 searches the common dictionary 1 for any dictionary data whose description is the same and whose exchange data source local dictionary belongs to the same group. If not found, the common dictionary management portion 2 goes to step 89. If found, the management portion 2 goes to step 90.

Step 89:

Since the same data is not found in the common dictionary 1, the common dictionary management portion 2 sets the "change type" to "delete" and adds the description to the common dictionary 1. For example, if in case of the common dictionary as shown in FIG. 9, a deletion request of a description "UNIX" is received from a natural language processing system whose local dictionary tag is "word processor A", the common dictionary management portion 2 changes "ID" to "D3", "description" to "UNIX", "change type" to "delete", "exchange data source local dictionary tag" to "word processor A", "Ti" to the editing time in the common dictionary, that is, "the current time T3", and "Tti" to the editing time in the change source local dictionary, that is, "Tt3", respectively. This is because the same description is not found in the common dictionary 1.

Step 90:

If, when any data of the same description and the same group is found, and the "change type" of the data described in the common dictionary 1 is "register", the common dictionary management portion 2 goes to step 91. If the "change type" is "delete", the common dictionary management portion 2 ends the processing because the data is already deleted.

Step 91:

If the "change type" is "register", the common dictionary management portion 2 compares the time Ti of registration for the exchange data source local dictionary with the time ti of deletion from the local dictionary. If the time ti is later, the common dictionary management portion 2 goes to step 92. Otherwise, the dictionary edit is older than the current registration. Thus, the common dictionary management portion 2 ends the processing without operation.

Step 92:

Since the deletion request from a local user dictionary is later, the "change type" of the dictionary data items is changed to "delete" in order to update the data. In addition, "Tti" is updated to "ti" and "Ti" to the current time, respectively. For example, if in case of the common dictionary as shown in FIG. 9, a deletion request of a description "INTERNET" is received from a natural language processing system having a local dictionary tag of "word processor B" and belonging to the same group as that of the natural language processing system whose local dictionary tag is "word processor A", the time t3 when "INTERNET" was deleted from the local dictionary of "word processor A" is compared with the time Tt1 when the description "INTERNET" was registered in the common dictionary. If Tt1 is later, the data in the common dictionary is newer. Thus, the request from the local dictionary is rejected. This is because the dictionary data is already registered in the common dictionary with the "change type" of "register". If Ti is later, the data items of the dictionary data whose "ID" is "D1", that is, "exchange data source local dictionary tag", "change type", "ti", "Tti", etc. are updated to "word processor B", "delete", "current time T3", and "t3", respectively.

Subsequently, the operation of the common dictionary management portion 2 when sending a dictionary edit request to the local dictionary management portion 6, will be explained with reference to the flow chart shown in FIG. 10. In other words, explanation will be made here for how a dictionary edit to be transmitted to a natural language processing system is selected from the data of the dictionary by each natural language processing system, which is accumulated in the common dictionary 1.

Figure 7:
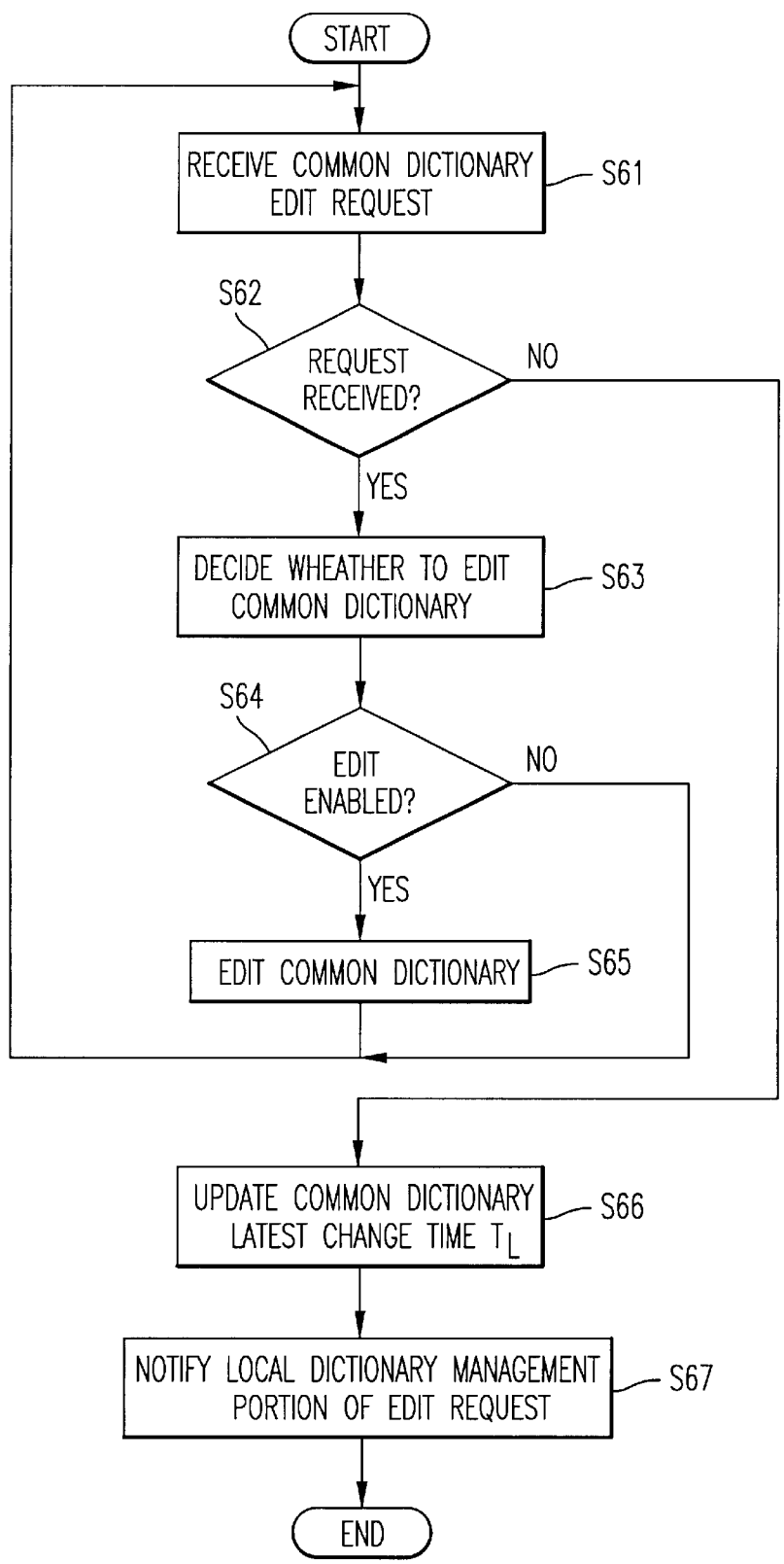
FIG. 7 is a flow chart explaining the operation of the common dictionary management portion notification of a dictionary edit request from the local user dictionary management portion.

A dictionary edit is sent from the common dictionary management portion 2 to the local dictionary management portion 6 not only in step 67 shown in FIG. 7, where the common dictionary edition request issued from a natural language processing system to the common dictionary management portion 2 is processed, but also in a request issued from the local dictionary management portion 6 to the common dictionary management portion 2 for updating the time on which the last dictionary request was sent from the common dictionary management portion 2.

Figure 8:
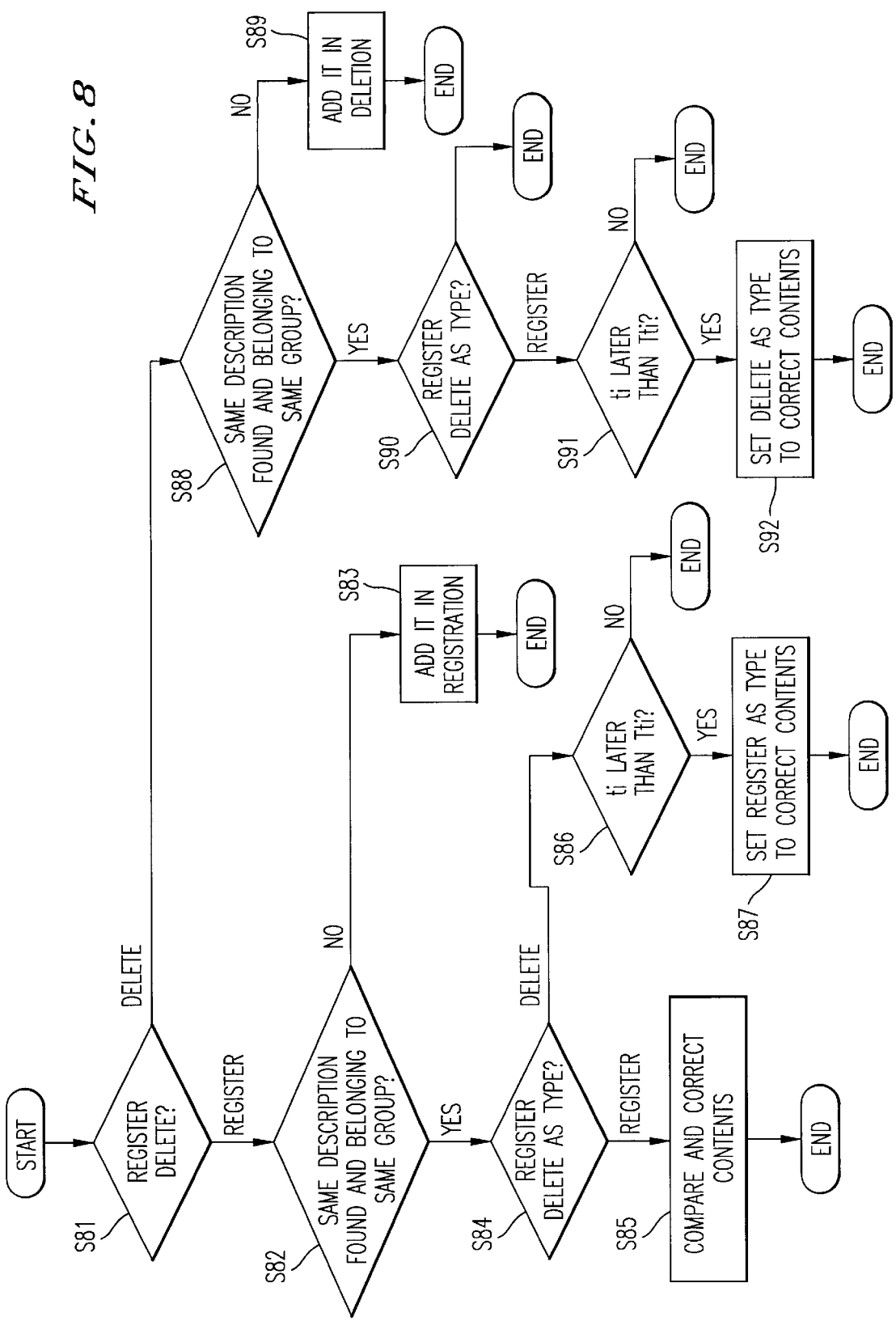
FIG. 8 is a flow chart explaining a dictionary editing operation for the common dictionary.

Step 71:

If a dictionary edit is started via the process in step 67 in FIG. 8, the natural language processing systems belonging to the group of the natural language processing system that initiated the dictionary edit send an inquiry to the management portion 3 for controlling a plurality of local dictionaries and are notified of dictionary edits sequentially. If a natural language processing system makes an inquiry on its own initiative, the dictionary edit is sent to the natural language processing system.

Step 72:

When the destination of a notification is decided, the common dictionary management portion 2 goes to step 73. Otherwise, the management portion 2 ends the processing.

Step 73:

The common dictionary management portion 2 requests the matching check time tc to the local user dictionary management portion 6 of the natural language processing system decided as the destination for notification in step 71. The time tc indicates the previous time when the common dictionary management portion 2 communicated with the local user dictionary management portion 6 for transmitting a dictionary edit.

Step 74:

The previous matching check time tc is compared with the time TL on which data was changed in the common dictionary 1. If the time TL is later, it means that data in the common dictionary 1 was changed after the time tc. Thus, the common dictionary management portion 2 goes to step 75 to check for the dictionary edit to send. Otherwise, the management portion 2 returns to step 71 to process the next destination for notification.

Step 75:

The matching check time tc is compared with the time Ti when data in the common dictionary 1 was edited. If the time Ti is later, the common dictionary management portion 2 searches the common dictionary to get all data items belonging to the same group as that of the selected destination for notification and having the exchange data source local dictionary tag, respectively.

Step 76:

If any data to be transmitted is found in step 75, the common dictionary management portion 2 goes to step 77. Otherwise, the management portion 2 returns to step 71 to process the next destination for notification.

Step 77:

Transmitting the dictionary edit found in step 75 to the local user dictionary management portion 6 of the destination system, the common dictionary management portion 2 returns to step 71 to process the next destination. The local user dictionary management portion 6 starts the processing in step 71 when notified of the dictionary edit in step 77.

As described above, a plurality of natural language processing systems may be used, for example, a description registered by word processor software on a terminal is registered in a dictionary of the translation software and added to a retrieval key word list for use. Conventionally, however, each description must be registered word by word for every dictionary in each version of the translation software. This common dictionary management system solves such troublesome registrations. Once a description is registered in any one of the local dictionaries, there is no need to register the description in other dictionaries.

Furthermore, even for a terminal disconnected from a network, all the changes made in all the dictionaries during the period of disconnection can be registered in the terminal automatically when the terminal is re-connected to the network.

Furthermore, since the management portion 3 for controlling a plurality of local dictionaries can limit the extension of a change generated in a dictionary to other dictionaries, the information transmission range can be controlled. For example, when a restriction is set so that people can register descriptions only to the local user dictionary management portion 6 used by specialists, the quality of dictionaries can be maintained. In addition, it is possible to prevent the transmission of descriptions such as organization and project names of a company to portable terminals that have lower security properties.

Next, how the common dictionary management system will operate when a new natural language processing system is added will be explained.

When a new natural language processing system is added to the common dictionary management system, the new language is registered in the management portion 3 for controlling a plurality of local dictionaries. Thus, the relationship between the new system and the existing system is also registered to the management portion 3 for controlling a plurality of local dictionaries. For example, it is assumed that a natural language processing system whose local dictionary tag is "word processor F" is added (see FIG. 11) when the table defining the relationship among local user dictionaries, which is stored in the management portion 3 for controlling a plurality of local dictionaries is as shown in FIG. 6. At this time, the local user dictionary management portion 6 of the natural language processing system whose local dictionary tag is "word processor F" first requests all the dictionary edits concerning the group A executed so far for the common dictionary management portion 2 and then registers them in the local user dictionary 4. Consequently, when a natural language processing system is added, the existing registered data is registered in the new system right away.

Conventionally, each time a computer is replaced and software is modified, data registration must be repeated for dictionaries from the beginning. This common dictionary management system, however, can register user-registered dictionary data items in any newly added natural language processing system, so that the data items can be shared by many natural language processing systems.

Furthermore, as an example of an application to extend a change generated in a local user dictionary using the common dictionary, all data other than the change of description data can be used. For example, the common dictionary may be connected not only to natural language processing systems, but also to data bases (DB). If the common dictionary is connected to a personnel DB and an organization DB, new organization names and person names can be used without registering them regardless of organizational restructuring and personnel reshuffles when the data bases are updated. In addition, it is possible to keep registering the latest terms by connecting the common dictionary to public data bases.

As explained above, according to this embodiment, the common dictionary management portion 2, communicating mutually with the local user dictionary management portion 6 of each natural language processing system, collects the dictionary data updated in any of a plurality of local user dictionaries used in a natural language processing system and the updating time information ti in the local user dictionary 4 of the dictionary data. It then updates the common dictionary 1 according to the collected dictionary data and the updating time information in the local user dictionary 4, and compares the latest time information tc on which dictionary data was distributed to the local user dictionary 4 with the updating time information Ti of the dictionary data. The dictionary data of the common dictionary 1, selected according to the result of the comparison is then distributed to local user dictionaries according to the conditions stored in the management portion 3 for controlling a plurality of local dictionaries. Thus, a change in the local user dictionary of a natural language processing system is registered automatically in the dictionaries of the selected natural language processing systems. Consequently, the range of the natural language processing systems can be managed for dictionary edits and the need to repeat the same dictionary edit for each dictionary can be eliminated.

The function of each portion described in the above embodiment can be stored distributed in a recording medium such as a magnetic disk (floppy disk, hard disk, etc.), an optical disk (CD-ROM, DVD, etc.), and/or a semiconductor memory, etc. as a program executable in a computer.

Dictionary information changes in a natural language processing system can thus be extended automatically into dictionaries in other natural language processing systems. Furthermore, the range of the information change extension can be controlled to significantly reduce the work of separately registering all dictionary updates into each natural language processing system.

While the invention has been described in detail and with reference to specific embodiments thereof, it will be apparent to one skilled in the art that various changes and modifications can be made therein without departing from the spirit and scope thereof.

What is claimed is:

1. A method of managing a common dictionary connected to a first local processing system and second local processing system, said first local processing system including first natural language processing and a first local dictionary having first data items, said second local processing system including a second local dictionary having second data items, said common dictionary having common data items including the first and second data items of each local dictionary, comprising steps of:

collecting updated dictionary data related to the first data items in the first local dictionary;

collecting updated dictionary data related to the second data items in the second local dictionary;

updating the common dictionary according to said collected dictionary data based on the common data items;

distributing said collected dictionary data in the common dictionary to each local dictionary, wherein said distributed dictionary data is related to each data item according to the type of each local processing system.

2. A method of managing a common dictionary according to claim 1, wherein each of said processing systems includes at least one of word processing, machine translation, character recognition, abstract creation, voice recognition, and voice synthesizing.

3. A method of managing a common dictionary connected to a first local processing system and second local processing system, said first local processing system including first natural language processing and a first local dictionary having first data items, said second local processing system including a second local dictionary having second data items, said common dictionary having common data items including the first and second data items of each local dictionary, the method comprising steps of:

collecting updated dictionary data related to the first data items in the first local dictionary and related to the second data items in the second local dictionary and updating time information of said dictionary data;

storing said collected common dictionary data in said common dictionary according to said updating time information;

comparing the information of the latest time at which dictionary data was distributed to the local dictionary of each of the local processing systems with the updating time information of said dictionary data in said common dictionary; and distributing said collected dictionary data in the common dictionary to each local dictionary, wherein said distributed dictionary data is related to each data item according to the type of each local processing system.

4. A method of managing a common dictionary according to claim 3, wherein each of said processing systems includes at least one of word processing, machine translation, character recognition, abstract creation, voice recognition, and voice synthesizing.

5. A system of managing a common dictionary connected to a first local processing system and second local processing system, said first local processing system including first natural language processing and a first local dictionary having first data items, said second local processing system including a second local dictionary having second data items, said common dictionary having common data items including the first and second data items of each local dictionary, comprising:

means for collecting updated dictionary data related to the first data items in the first local dictionary;

means for collecting updated dictionary data related to the second data items in the second local dictionary;

means for updating the common dictionary according to said dictionary data collected by said collecting means based on the common data items;

means for distributing said collected dictionary data in the common dictionary updated by said updating means to each dictionary of said local processing systems that satisfy preset conditions, wherein said distributed dictionary data is related to each data item according to the type of each local processing system.

6. A system of managing a common dictionary according to claim 5, wherein each of said processing systems includes at least one of word processing, machine translation, character recognition, abstract creation, voice recognition, and voice synthesizing.

7. A system of managing a common dictionary, the system collecting dictionary data from the local dictionaries of a first local processing system and second local processing system, said first local processing system including first natural language processing and a first local dictionary having first data items, said second local processing system including a second local dictionary having second data items, said common dictionary having common data items including the first and second data items of each local dictionary, comprising:

a common dictionary storing common dictionary data of the dictionaries of said first and second natural language processing systems;

means for collecting updated dictionary data related to the first data items in the first local dictionary;

means for collecting updated dictionary data related to the second data items in the second local dictionary;

means for updating the common dictionary according to said dictionary data collected by said collecting means based on the common data items;

means for distributing said collected dictionary data of said common dictionary updated by said updating means that satisfy preset conditions to each local dictionary, wherein said distributed dictionary data is related to each data item according to the type of each natural language processing system.

8. A system of managing a common dictionary according to claim 7, wherein each of said natural language processing systems includes at least one of word processing, machine translation, character recognition, abstract creation, voice recognition, and voice synthesizing.

9. A system of managing a common dictionary connected to a first local processing system and second local processing system, said first local processing system including first natural language processing and a first local dictionary having first data items, said second local processing system including a second local dictionary having second data items, said common dictionary having common data items including the first and second data items of each local dictionary, comprising:

means for collecting updated dictionary data related to the first data items in the first local dictionary and related to the second data items in the second local dictionary and updating time information of said dictionary data;

means for storing the updated dictionary data collected by said collecting means according to said updating time information;

means for comparing the information of the latest time at which dictionary data was distributed to the local dictionary of each of said processing systems with the updating time information of said dictionary data in said common dictionary; and means for distributing said collected dictionary data in the common dictionary selected according to the result of said comparison and determination to each local dictionary of each of said processing systems that satisfy preset conditions, wherein said distributed dictionary data is related to each data item according to the type of each local processing system.

10. A system of managing a common dictionary according to claim 9, wherein each of said processing systems includes at least one of word processing, machine translation, character recognition, abstract creation, voice recognition, and voice synthesizing.

11. A system of managing a common dictionary, the system collecting dictionary data from a first local processing system and second local processing system, said first local processing system including first natural language processing and a first local dictionary having first data items, said second local processing system including a second local dictionary having second data items, said common dictionary having common data items including the first and second data items of each local dictionary, comprising:

a common dictionary storing dictionary data of the local dictionaries of a plurality of said natural language processing system;

means for collecting updated dictionary data related to the first data items in the first local dictionary and related to the second data items in the second local dictionary and the dictionary data updating time information in said local dictionary;

means for updating the common dictionary according to said updated dictionary data based on the common data items collected by said collecting means and the updating time information of said dictionary data; and means for comparing the information of the latest time at which dictionary data was distributed to local dictionary of each of said natural language processing systems with the updating time information of said dictionary data in said common dictionary, result of said comparison and determination being used to select and distribute said collected dictionary data of said common dictionary to each local dictionary of said natural language processing systems that satisfy preset conditions, wherein said distributed dictionary data is related to each data item according to the type of each natural processing system.

12. A system of managing a common dictionary according to claim 11, wherein each of said natural language processing systems includes at least one of word processing, machine translation, character recognition, abstract creation, voice recognition and voice synthesizing.

13. A recording medium storing a common dictionary and common dictionary management software for managing said common dictionary, both of said common dictionary and said common dictionary management software being enabled to be read by a computer used to connect a plurality of language processing software via a communication line commonly, said each language processing software having a first local processing system and second local processing system, said first local processing system including first natural language processing and a first local dictionary having first data items, said second local processing system including a second local dictionary having second data items, said common dictionary having common data items including the first and second data items of each local dictionary, comprising:

a function for collecting updated dictionary data related to the first data items in the first local dictionary via said communication line;

a function for collecting updated dictionary data related to the second data items in the second local dictionary via said communication line;

a function for updating said common dictionary according to said collected updated dictionary data based on the common data items; and a function for distributing said collected dictionary data of said updated common dictionary to each local dictionary of said language processing software that satisfy preset conditions via said communication line, wherein said distributed dictionary data is related to each data item according to the type of each language processing software.

* * * * *